Sept. 24, 1957 D. W. TERRY ET AL 2,807,352
CONVEYOR APPARATUS
Filed April 2, 1954 2 Sheets-Sheet 2
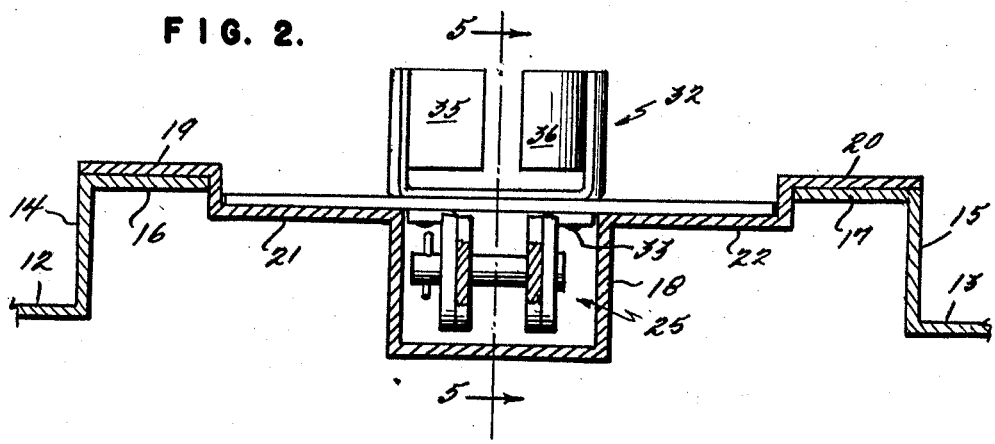
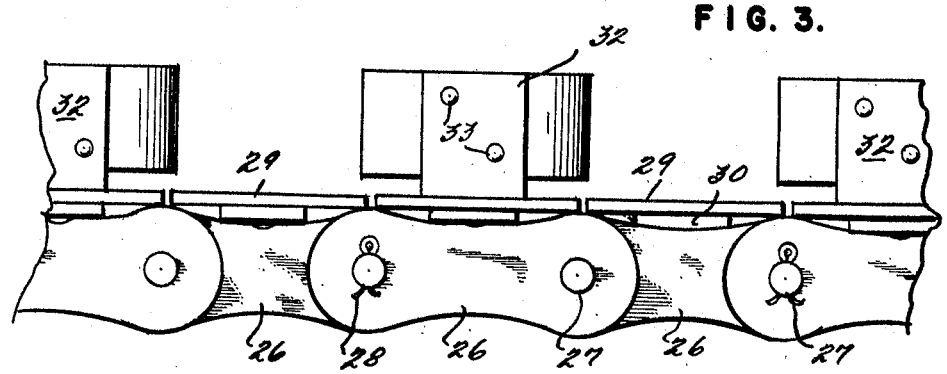
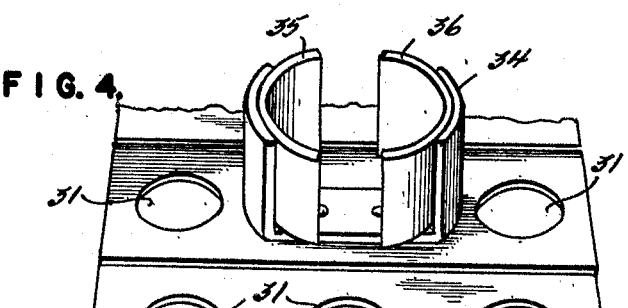
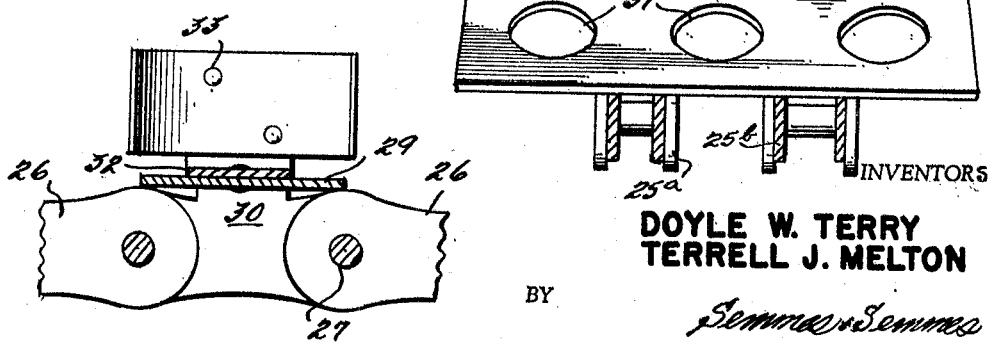
INVENTORS
DOYLE W. TERRY
TERRELL J. MELTON
BY
ATTORNEYS

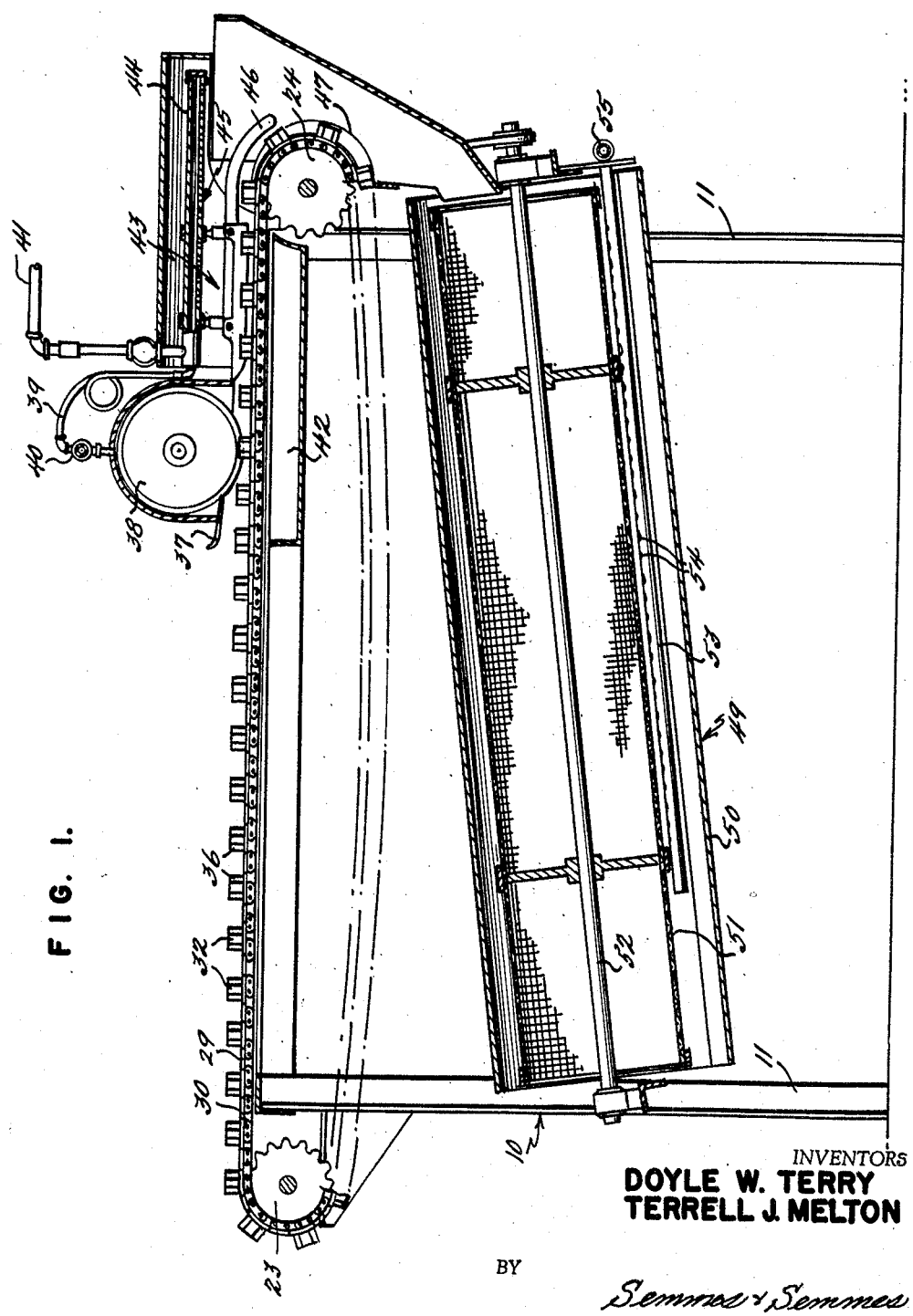

United States Patent Office 2,807,352
Patented Sept. 24, 1957

2,807,352

CONVEYOR APPARATUS

Doyle W. Terry and Terrell J. Melton, Athens, Ga.

Application April 2, 1954, Serial No. 420,696

6 Claims. (Cl. 198—131)

The present invention relates broadly to article conveying apparatus. More specifically the present invention relates to means for continuously conveying poultry gizzards and the like.

This application constitutes a continuation-in-part of our co-pending application, Serial Number 379,122, filed September 9, 1953, now Patent No. 2,707,303.

As more particularly set forth in our co-pending application, above identified, our invention relates to means for cutting and cleaning gizzards of poultry, particularly those of chickens, and contemplates means which automatically cut gizzards while subjecting them to an initial washing. Thereafter the gizzards are opened and spread, while being subjected to a second washing under the influence of high pressure water jets, and then the gizzards which have been spread and cleaned are passed into a third washing and tumbling mechanism to complete the cleaning of the gizzards. From this final cleaning, the gizzards are passed to conveying means for transporting to inspection and packaging devices.

For each of the various stages, as set forth above, automatic means must be provided for conveying the gizzards in a continuous movement, and in substantially large numbers to the various stations for the different steps in the operation. Completely satisfactory means to effect this have not heretofore been available.

It is accordingly an object of the present invention to provide a conveyor system which will answer the needs of the packaging industry and which manifestly can be adapted to other uses as will appear from the following description.

In accordance with the present invention, there is provided a conveyor system having a plurality of individual gizzard receiving cups which are spaced apart in line with the direction of travel of a conveyor. The conveyor in itself comprises an endless link chain having a plurality of links carrying substantially flat plate members thereon, and having on the upper surface thereof gizzard receiving cups.

Another object of the present invention is to provide, in such conveyor means, gizzard receiving cups which are of a simple and sturdy construction, and which consist in upstanding bracket members secured to plates carried by the conveyor chain links, and supporting substantially semi-circular laterally spaced elements which are preferably formed in an oval shape, so as to accommodate the normal shape of a chicken or other fowl or poultry gizzard.

A still further object of the present invention is to provide novel and stable supporting means for the individual plates and links comprising the conveyor mechanism.

A still further object of the present invention is to provide, in a conveyor mechanism for articles such as poultry gizzards, receiving, retaining, and conveying cups which are of a construction whereby several successive operations can be effected on the gizzards without interference with the conveying mechanism or with the mechanism effecting the separate steps. This phase of the invention contemplates the use of half cup elements, spaced laterally with respect to the longitudinal direction of movement of the cups, whereby cutting means and spreading means can pass between the two half cup portions to cut and spread the gizzards.

Other objects and advantages of the present invention will be readily apparent from the following detailed description of an embodiment of the invention, when taken together with the accompanying drawings in which:

Fig. 1 is a side elevational view of mechanism adapted for cutting and cleaning poultry gizzards and the like, showing the overall device in which the mechanism is incorporated;

Fig. 2 is a sectional view through the table of Fig. 1 and showing, partially in elevation, the conveying mechanism of the present invention;

Fig. 3 is a fragmentary side elevational view of the conveyor chain and conveying cups;

Fig. 4 is a perspective view of a portion of the conveyor chain showing the plates and conveying cups mounted thereon; and Fig. 5 is a sectional view taken on the line 5—5 of Fig. 2.

In the drawings like reference characters apply to like parts and the following specification is to be read and understood in this light.

In Fig. 1 of the drawings there is shown a table 10 supported on spaced vertical legs or uprights 11, and laterally spaced table or top portions 12 and 13. The spaced top portions 12 and 13 each have upstanding projections 14 and 15 and laterally extending flanges 16 and 17 forming therebetween an open channel.

A channel shaped member 18 having raised outwardly extending lateral flanges 19 and 20 is inserted between the inner extremities of the lateral flanges 16 and 17. The flanges 19 and 20 are supported on the flanges 16 and 17, as more clearly shown in Fig. 2 of the drawings. The horizontal portions 21 and 22 which are lower than flanges 19 and 20 are adapted to support plates forming a portion of the conveyor chain as will appear hereinafter.

Sprocket wheels 23 and 24 are rotatably journaled at each end of the table and entrained around these sprocket wheels is a continuous link chain conveyor generally designated 25. The conveyor chain 25 consists of a plurality of link sections 26 connected together by means of pins 27, and cotter pins 28 or the like in a usual manner. Mounted on top of the individual link sections, and in contiguous relationship with one another, are flat plates 29. These flat plates are secured to the individual link sections 26 by welding or in any other desired manner. If desired, upstanding lugs or projections can be formed on the link sections, such as indicated at 30, to facilitate the securement of the plates onto the linked sections. Each of the plates is provided with spaced holes 31 therein as shown in detail in Fig. 4.

Surmounted over the central openings or holes 31 of various spaced ones of the plates 29, are bracket members 32. The bracket members can be secured to the plates in any well known manner, but as shown in Fig. 2 of the drawings rivets such as at 33 can be used. The upstanding portions of bracket members 32 are curved as indicated at 34. Secured inwardly of the curved portions 34 of bracket members 32, there are substantially semi-circular laterally spaced half cup elements 35 and 36 which together form a preferably oval shaped gizzard holding and retaining cup. It will be seen from Fig. 4 of the drawings that an opening is provided between the cup portions 35 and 36 extending in the direction of travel of the conveyor chain.

In Fig. 2, a single chain conveyor is shown. The plates 29 ride on the horizontal portions 21 and 22 of the channel member 18, the portions 21 and 22 being recessed slightly below the horizontal portions 19 and 20 of the channel member. Single sprocket wheels 23 and 24 are provided for this form of the invention, and by engaging with the links between the individual sections of the conveyor chain will move the chain along the surface of the table and accordingly the cups containing the gizzards to be cut and washed.

If desired however, and as shown in Fig. 4, pairs of spaced sprocket wheels can be utilized at each end and, instead of a single link chain, two spaced link chains 25a and 25b are utilized for engaging with the pairs of sprocket wheels. The construction is otherwise the same.

In operation of the device, gizzards are placed in each of the cups formed by the half cup portions 35 and 36 as the conveyor chain moves along the longitudinal run of the table. The cups first come to an initial cutting station where they are compressed by means of guide and pressure plates 37 arranged on each side of a rotary knife blade 38. The spaced pressure plates 37 compress the gizzard into the cups and then as the cups advance along the table, the knife blade 38 passes between the portions 35 and 36 and slits the gizzard approximately one half to two-thirds the thickness thereof. During this initial cutting, washing of the blade and of the partially cut gizzards is effected by means of water coming through pipe 39 controllable by valve 40 and fed from a main source of water supply through pipe 41. Preferably the base of the channel member 18 is open or has a plurality of openings therethrough so that water passing down over the blade and the partially cut gizzards will flow therefrom and through the openings 31 in the plates, as also the base of the channel and into a trough 42 from whence it is exhausted.

Following this initial cutting and washing, the cups pass next to a spreading and cutting station wherein a cutter and spreader assembly, generally designated 43, coacts with the half cup members 35 and 36. A central knife member extends between the members 35 and 36 and serves to further cut the gizzard. Transversely spaced members coacting with the tops of the cup portions force the gizzard to spread. During this spreading and additional cutting operation the gizzards are subjected to a second washing by means of water fed from pipe 68, also fed from pipe 41 and having openings or holes 45 in the lower side thereof.

After this further cutting, spreading, and washing, the gizzard cups pass around the rearward end of the drive sprocket 24 while the gizzards are maintained in spread position therein by curved ends 46 of the spreader and cutter device. Thereafter an ejector 47 passes between the cup half portions 35 and 36, in proximity to the base or plate 29, and ejects the gizzards into chute 48 which carries the gizzards into a tumbling and washing device generally designated 49.

The washing device consists of an outer tubular casing 50, preferably slotted at the base thereof and a rotating inner cylinder 51 which is the mesh screen and carried for rotation on a shaft 52 suitably journaled at the ends and having means for rotation thereof. Spaced between the outer wall 50 and the rotating mesh cylinder are pipes 53 in spaced positions and having openings 54 therein, so directed as to direct sprays or jets of water toward one another at an angle and into and through the rotating screen 51. The pipe is fed from a source of water through the pipe 55. After the split and preliminarily washed gizzards have passed through the chute 47 into the tumbling and washing device, and subjected to a tumbling and final washing they are then discharged at the lower end of the wire mesh cylinder and from there are carried to an inspecting and packaging station.

It will be seen from the foregoing description that the conveyor chain and the cups formed thereon are of simplicity in construction and yet particularly adapted and suitable for coaction with the remainder of a device such as shown in Fig. 1 of the drawings. The individual elements can be readily and easily repaired and replaced and the gizzards while being securely held and conveyed in the cups are maintained free for cutting, spreading and cleaning thereof by the individual elements of the device.

Manifestly, minor changes in details of construction can be effected by those skilled in the art to which the invention pertains without departing from the spirit and scope of the invention as defined in the appended claims.

We claim:

1. Conveying mechanism for poultry gizzards and the like including a plurality of flat horizontal plates forming a movable conveyor, gizzard holding and retaining means carried by said movable conveyor, said holding and retaining means comprising upstanding U-shaped brackets mounted on said plates, and laterally spaced half cup portions removably secured to said brackets on the upper surfaces of spaced ones of said plates.

2. Conveying mechanism for poultry gizzards and the like as claimed in claim 1, said brackets being curved and said half cup portions being curved and coacting to form a substantially oval shaped gizzard retaining cup of a shape conforming to that of a gizzard.

3. Conveying mechanism for poultry gizzards and the like including a movable conveyor, gizzard holding and retaining means carried by said movable conveyor, said holding and retaining means comprising laterally spaced half-cup portions secured on the upper surface of said movable conveyor, a horizontal supporting table for said conveyor having a longitudinally extending channel, said conveyor comprising an endless conveyor, horizontal flat plates mounted on said endless conveyor and carrying said half cup portions, said conveyor extending into said channel and said plates riding on the inner edges of said channel.

4. Conveying mechanism for poultry gizzards and the like including a movable conveyor, gizzard holding and retaining means carried by said movable conveyor, said holding and retaining means comprising laterally spaced half-cup portions secured on the upper surface of said movable conveyor, a horizontal supporting table for said conveyor having a longitudinally extending channel, said conveyor comprising an endless conveyor link chain, horizontal flat plates mounted on links of said chain and carrying said half-cup portions, said chain extending into said channel, upstanding inwardly directed flanges at the inner edges of said channel, a channel shaped member having laterally extending flanges inserted in said channel and having its flanges carried by and supported on said inwardly directed flanges.

5. Conveying mechanism for poultry gizzards and the like as claimed in claim 4, said channel shaped member having horizontal portions positioned lower than said laterally extending flanges, said plates being slidably supported on said horizontal portions.

6. Conveying mechanism for poultry gizzards and the like as claimed in claim 5, the bottom of said channel shaped member being provided with drainage openings therethrough.

References Cited in the file of this patent

UNITED STATES PATENTS

| 215,153 | Myers | May 6, 1879 |
| 2,021,748 | Schaefer | Nov. 19, 1935 |
| 2,094,398 | Dostal | Sept. 28, 1937 |
| 2,455,675 | Hawk | Dec. 7, 1948 |
| 2,568,947 | Carroll | Sept. 25, 1951 |
| 2,687,206 | Carroll | Aug. 24, 1954 |

FOREIGN PATENTS

| 286,828 | Great Britain | Mar. 15, 1928 |
| 691,695 | Great Britain | May 20, 1953 |